United States Patent
Porte et al.

(10) Patent No.: US 9,810,964 B2
(45) Date of Patent: Nov. 7, 2017

(54) ELECTRO-OPTIC MODULATOR HAVING IDENTICAL FORWARD AND BACKWARD ELECTRO-OPTIC RESPONSE

(71) Applicant: LEICA GEOSYSTEMS AG, Heerbrugg (CH)

(72) Inventors: Henri Porte, Serre les Sapins (FR); Alexandre Mottet, Besancon (FR); Thomas Luthi, Aarau (CH); Burkhard Bockem, Brugg (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 184 days.

(21) Appl. No.: 14/394,206

(22) PCT Filed: Mar. 6, 2013

(86) PCT No.: PCT/CH2013/000035
§ 371 (c)(1),
(2) Date: Oct. 13, 2014

(87) PCT Pub. No.: WO2013/155636
PCT Pub. Date: Oct. 24, 2013

(65) Prior Publication Data
US 2015/0070709 A1    Mar. 12, 2015

(30) Foreign Application Priority Data
Apr. 16, 2012  (EP) .................................... 12405037

(51) Int. Cl.
*G02F 1/01*  (2006.01)
*G02F 1/225*  (2006.01)
(Continued)

(52) U.S. Cl.
CPC ....... *G02F 1/2255* (2013.01); *G01B 9/02049* (2013.01); *G01B 11/14* (2013.01);
(Continued)

(58) Field of Classification Search
CPC ...... G02F 1/2255; G02F 1/365; G02F 1/0356; G02F 1/0316; G01B 11/14; G01B 9/02049; G01S 17/32; G01S 17/36; G01S 7/4812
See application file for complete search history.

(56) References Cited

U.S. PATENT DOCUMENTS 4,280,110 A   7/1981  Cachier et al.
5,050,948 A   9/1991  Hawkins, II et al.
(Continued)

FOREIGN PATENT DOCUMENTS

CN   1172532       2/1998
EP   0 205 406    12/1986
(Continued)

OTHER PUBLICATIONS

Loayssa, Alayn et al.; "Design and Performance of the Bidirectional Optical Single-Sideband Modulator", Journal of Lightwave Technology, IEEE Service Center, New York, NY, vol. 21, No. 4, Apr. 1, 2003.
(Continued)

*Primary Examiner* — Hwa Lee
(74) *Attorney, Agent, or Firm* — Rankin, Hill & Clark LLP (57) ABSTRACT

An electro-optic modulator includes a waveguide of a non-linear optical material and an electrode line for generating an electrical field in a modulating region of the waveguide when a voltage is applied to the electrode line, thereby modulating light passing through the waveguide. Therein, the forward electro-optic response of the modulating region is the same as the backward electro-optic response; and the electro-optic response has a band-pass or a low-pass characteristic. A distance measuring device includes a light source emitting light, and such an electro-optic modulator arranged such that the emitted light passes through the (Continued)

electro-optic modulator in a first direction before being emitted from the distance measuring device, and after being reflected from a target passes through the electro-optic modulator in a second direction which is opposite to the first direction.

14 Claims, 4 Drawing Sheets

(51) Int. Cl.

| | | |
|---|---|---|
| *G02F 1/035* | (2006.01) | |
| *G01S 17/36* | (2006.01) | |
| *G01S 7/481* | (2006.01) | |
| *G01B 9/02* | (2006.01) | |
| *G01B 11/14* | (2006.01) | |
| *G01S 17/32* | (2006.01) | |
| *G02F 1/365* | (2006.01) | |
| *G02F 1/03* | (2006.01) | |

(52) U.S. Cl.
CPC ............ *G01S 7/4812* (2013.01); *G01S 17/32* (2013.01); *G01S 17/36* (2013.01); *G02F 1/0356* (2013.01); *G02F 1/365* (2013.01); *G02F 1/0316* (2013.01)

(56) References Cited

U.S. PATENT DOCUMENTS

| | | |
|---|---|---|
| 5,129,017 A | 7/1992 | Kawano et al. |
| 5,138,480 A | 8/1992 | Dolfi et al. |
| 5,278,924 A | 1/1994 | Schaffner |
| 5,764,360 A | 6/1998 | Meier |
| 9,405,007 B2 * | 8/2016 | Luthi ...................... G01S 17/36 |
| 2002/0071622 A1* | 6/2002 | Betts ...................... G02F 1/2257 385/2 |
| 2005/0018276 A1 | 1/2005 | Kourogi et al. |
| 2009/0148111 A1 | 6/2009 | Nakamura et al. |

FOREIGN PATENT DOCUMENTS

| | | |
|---|---|---|
| EP | 0 313 518 | 4/1989 |
| EP | 1199593 | 4/2002 |
| EP | 1 647 838 | 4/2006 |
| EP | 2 381 269 | 10/2011 |
| JP | 5-302978 | 11/1993 |
| JP | 7-128623 | 5/1995 |
| JP | 9236783 | 9/1997 |
| JP | 2001-194268 | 7/2001 |
| WO | 97/18486 | 5/1997 |
| WO | 02/097526 | 12/2002 |
| WO | 2013/155637 | 10/2013 |

OTHER PUBLICATIONS

Roger Krähenbühl et al., "Investigations on Short-Path-Length High-Speed Optical Modulators in LiNbO3 With Resonant-Type Electrodes", Journal of Lightwave Technology, vol. 19, No. 9, Sep. 2001, pp. 1287-1297, discussed in the specification.

Gary E. Betts et al., "High-Sensitivity Lumped-Element Bandpass Modulators in LiNbO3", Journal of Lightwave Technology, vol. 7, No. 12, Dec. 1989, pp. 2078-2083, discussed in the specification.

* cited by examiner

Fig. 4a $$f_{PB} = \frac{c}{2n_m \ell}$$

ELECTRO-OPTIC MODULATOR HAVING IDENTICAL FORWARD AND BACKWARD ELECTRO-OPTIC RESPONSE

BACKGROUND OF THE INVENTION

Field of the Invention

The invention relates to an electro-optic modulator and to an electro-optic distance measuring.

Description of Related Art

U.S. Pat. Nos. 5,129,017, 5,050,948, 5,138,480, 5,278,924, WO02097526 and JP 9236783 A disclose integrated (coplanar waveguide or CPW) optics modulators with travelling wave electrodes. The modulators are structured as Mach-Zehnder-Modulators, that is, a beam of light is split up into two parts, one part of the light is phase modulated, the two parts are rejoined, and as a result the amplitude of the rejoined parts is modulated in accordance with the phase modulation. The light takes a single pass through the modulator, that is, in one direction only.

Investigations on short path length high speed optical modulators in LiNbO3 with resonant type electrodes, R. Krahenbiihl, M. M. Howerton, Journal of Lightwave Technology, Vol. 19, No. 9 pp. 1287-1297 (2001) describes different types of resonant electrode structures with the goal of reducing the active electrode length and enhance modulation efficiencies. Electrode topologies shown are limited to Mach-Zehnder-Modulators.

High-sensitivity lumped-element bandpass modulators in LiNbO3, G. E. Betts, L. M. Johnson, C. H. Cox, IEEE/OSA Journal of Lightwave Technology, Vol. 7, no. 12, pp. 2078-2083, December 1989, describes bandpass modulators based on an integrated Mach-Zehnder-Modulator.

Design and performance of the bidirectional optical single-sideband modulator, A. Loayssa et. al., Journal of Lightwave Technology, Vol 21, No. 4, pp. 1071-1082, April 2003, present a study of a bidirectional optical single-sideband modulator used to achieve optical single-sideband modulation that uses a standard single-electrode Mach-Zehnder modulator and passive fiber-optic components. The electrooptic modulator is operated by driving the radio frequency electrode bidirectionally, that is, with one signal each fed into opposing ends of the same electrode.

Figures 1, 2A:
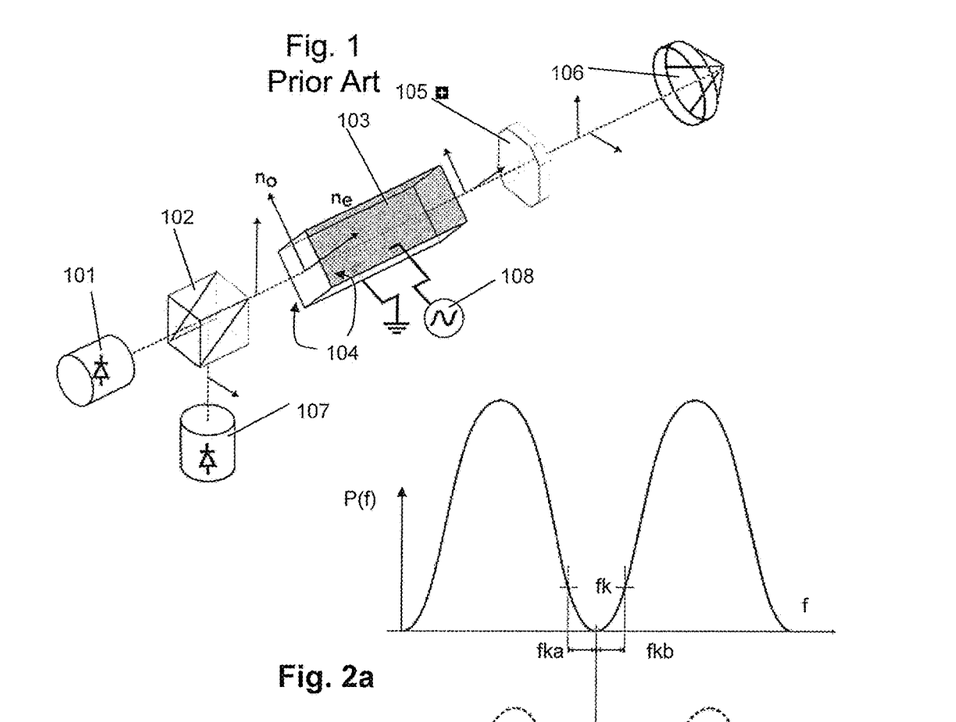
FIG. 1 the structure of an optical distance measuring device for measuring absolute distance.
FIG. 2a, 2b the frequency dependence of a signal measured in the distance measuring device.

FIG. 1 schematically shows a distance measuring device for measuring absolute distance according to the prior art, wherein a light source 101 emits light, typically in the visible or infrared range, with center wavelength λ, the spectral width Δλ of the source being broad enough in order to ensure a low coherence light emission. The parallel light beam emitted by the broadband source 101 illuminates a polarising beam splitter 102, which ensures a linear polarization state for one of the transmitted beams. The polarized beam passes through an electro-optic crystal 103 having electrodes 104 on opposite sides. The electrodes 104 allow application of an electric field parallel to one of the main crystallographic axis of the electro-optic crystal 103. A sinusoidal electric signal with a frequency f is generated by a signal source 108 and applied to the electrodes 104. This electric field generates a modification of the refractive index difference between the slow and the fast optical axes of the crystal. A phase modulation is thus introduced between the two orthogonal waves.

At the output of the electro-optic crystal 103, a quarter wave plate 105 is placed with its axes oriented at 45° with respect to the main axes of the electro-optic crystal 103. The light beam after passing through the quarter wave plate 105 passes on, along the distance to be measured, to reach a target. A corner mirror 106 or other reflecting element is fixed to the target, reflecting the light back to the optical source. After passing a second time through the quarter wave 105 plate, the two orthogonal waves of the returning light are rotated by 90° and cross the electro-optic crystal 103 a second time, now in the opposite direction. A resulting beam, modulated in amplitude according to the interference of outgoing and returning light, is captured by a photoreceiver 107.

Relevant distance-measuring devices according to this principle are known from EP 0 205 406, EP 0 313 518, EP-A-1 647 838, WO 97/18486 and EP patent application number 10 405 078, for example. The content of these applications is incorporated in its entirety by reference for elucidating the functioning of the Fizeau method for absolute distance measurement.

Basically, a light beam, from a laser or from a broadband light source, is generated, and guided by a focusing optical unit onto a polarizing beam splitter for linearly polarizing the light, and is subsequently guided onto a measurement path by an electro-optical modulator, a lambda/4 retarder and an exit optical unit. Light returning along the measurement path passes through the elements mentioned as far as the polarizing beam splitter and is guided onto a detector by the latter. An evaluation unit serves for determining the length of the measurement path on the basis of the detector signal.

What is of importance in the present context is that, in this method, outgoing and returning measurement light is modulated in a modulator. By variation of the frequency of the modulation, a minimum of the intensity of a detected measurement light beam is determined (or substantially synonymously, a zero-crossing of the derivative of the intensity). The length of the measurement path between the measurement device and a retroreflector or a semi-cooperative target is determined from the minimum frequency. A semi-cooperative target returns at least part of incident light along the direction of the incident light, e.g. by diffuse reflection.

Current implementations of Fizeau-principle based distance-measuring devices use electro-optic modulators with bulk crystals exhibiting the Pockels-effect. In order to reach the voltages of several 100 V (over a crystal width of ~1 mm) required for full modulation, the modulator needs an electrical drive-power of ~1 W, and the crystal is placed in a electrical resonator. Setting a particular modulation frequency requires mechanical tuning of the resonator, thus limiting the measurement rate (to e.g. 20 Hz).

It is desirable to speed up the measurement by using an integrated optics modulator in a distance measurement device. However, since the measurement principle of the distance measurement device requires the light to pass the modulator twice, in opposing directions, known single pass modulators are not suitable.

SUMMARY OF THE INVENTION

It is therefore an object of the invention to create an electro-optic modulator that can be used in a distance measurement device as described above, in which both outgoing and returning light passes through the same modulator.

A further object of the invention is to create a distance measuring device, using an integrated optics modulator which is traversed by both outgoing and returning light.

A further object of the invention is to create a distance measuring device having an electro-optical modulator that can be operated with lower modulating voltages and with lower power consumption than known modulators.

These objects are achieved by an electro-optic modulator and a distance measuring device according to the present invention.

The electro-optic modulator comprises a waveguide of a nonlinear optical material and an electrode line arranged to generate an electrical field in a modulating region of the waveguide when a voltage is applied to the electrode line, thereby modulating the phase of light passing through the waveguide. Therein the forward electro-optic response of the modulating region is the same as the backward electro-optic response (in other words: the effect, such as the phase shift, on light passing the modulator in one direction and light passing in the opposite direction is the same); and the electro-optic response in the used modulation frequency range has a flat (e.g. low-pass or band-pass) characteristic.

The combination of these two properties allows the use of the modulator in an application in which two beams of light pass through the modulator in opposite directions and where it is important that the two beams be modulated with a high frequency, e.g. in the GHz range, in essentially the same manner. In this microwave frequency range, the wavelengths of signals is roughly the same as the dimensions of the electrode line.

Note: A "band-pass characteristic" means, as is commonly known, that the electro-optic response is essentially zero when a DC voltage is applied to the electrode line, and with increasing frequency rises to a maximum and then falls again at least once.

Note: An optical waveguide is a physical structure that guides electromagnetic waves in the optical spectrum. Common types of optical waveguides include optical fibers and rectangular waveguides. In an optical waveguide, only selected modes of the light can propagate along the length of the waveguide, since the lateral dimensions of the waveguide (that is, the dimensions orthogonal to the length of the waveguide, along which the light propagates) are within the range of a few wavelengths of the light.

In contrast to this, in a bulk crystal or volume crystal, the lateral dimensions are significantly larger than the wavelength of the light or the diameter of a beam of light passing through the crystal, and the propagation of different modes of the light is not affected by the dimensions of the crystal. Depending on the type of crystal, the light may of course be affected by other properties of the crystal (refraction, dispersion, etc. . . . ). Different from a waveguide, a bulk crystal or volume crystal does not have a light guiding function.

With such an integrated optics modulator with a very small waveguide and electrode separation, the field strength required for full modulation is thus reached with a modulation voltage of only a few Volts, resulting in a dramatic reduction of drive-power and eliminates the need for an external resonator and its time consuming mechanical tuning.

In an embodiment, the center of gravity of modulation is independent of modulation frequency. The center of gravity of modulation is a point along the waveguide. Its location $y_{COG}$ is defined as the integral, over the position along the waveguide, of the product of the phase modulation per unit length a with the position y, divided by the integral, over the position along the waveguide, of the phase modulation. That is $$y_{COG} = \int_{y1}^{y2} a(y) y \, dy / \int_{y1}^{y2} a(y) \, dy$$

where y1 and y2 are the beginning and the end position of the modulation region along the waveguide axis Y. As a result, the center of gravity of modulation divides the waveguide into two sections, with the total modulation of the light in both sections being the same (the total modulation in one section is the integral of the modulation along the section).

The distance measuring device comprises the electro-optic modulator. This allows the distance measuring device to perform at a high measurement rate with high accuracy and with low power consumption.

In an embodiment, the distance measuring device includes a light source emitting light, with the electro-optic modulator being arranged in the distance measuring device such that light emitted by the light source passes through the electro-optic modulator in a first direction before being emitted from the distance measuring device, and such emitted light after being reflected from a target outside the distance measuring device passes through the electro-optic modulator in a second direction which is opposite to the first direction.

In an embodiment, the modulating region includes a first subregion and a second subregion and the electrode line is capable to effect on light passing in one direction through the first subregion the same modulation as on light passing in the opposite direction through the second subregion.

In an embodiment, the electrode line includes a first branch and a second branch, each branch first running from a beginning to an end of a first line section parallel to the waveguide for a distance henceforth denoted extension of the branch, and then running from a beginning to an end of a second line section parallel to the waveguide for the same distance in a direction opposite to the first line section, and wherein the propagation time of a microwave signal (i.e. the same microwave signal for both branches) from the beginning of the first line section to the end of the second line section is the same for both branches.

Thus, as opposed to, e.g., a Mach-Zehnder integrated optical modulator, in which an optical path is split into two separate waveguides running in parallel, the electrodes are arranged to modulate light along just one waveguide. In an embodiment, for each branch the separate line sections (two or more) run along the same modulation region of the waveguide. For example, two or more line sections of the first branch run along a first modulation subregion of the waveguide, and two or more line sections of the second branch run along a second modulation subregion of the waveguide.

When an electrical signal is applied to the electrode lines, for each branch the electrical fields from the first and second line section (and possibly from a third line section of the branch, or even further sections of the same branch) are superposed and affect the same region along the waveguide.

In an embodiment, the modulator can include just a single waveguide along which modulation takes place, without there being a further waveguide split off and/or joining the waveguide.

The relative location of the electrode line and the waveguide is such that a voltage difference between the first line section and the second line section causes an electrical field in the waveguide. The end of the first line section is electrically connected to the beginning of the second line section.

In an embodiment,
each branch, from the end of the second line section
runs in a third line section parallel to the waveguide for the same distance in the same direction as the first line section,
and the propagation time of a microwave signal from the beginning of the first line section to the end of the third line section is the same for both branches.

The superposition of the electrical fields from the two or three (depending on the embodiment) line sections affecting the modulation region results in the electrical field in the waveguide oscillating like a standing wave, symmetrical along the length of the lines, which in turn causes the symmetrical optical response.

In an embodiment, the electrode line comprises a first branch and a second branch and a midpoint between the two branches, wherein the electrode line is able, when connected to an electric microwave signal source, to generate an electrical field distribution in the waveguide that is symmetrical with respect to the midpoint. The midpoint may be, but need not, be a geometric center between the two branches.

As a result, light passing through the waveguide along the length of the modulating section in one direction experiences the same total phase shift (which is the integral of the time dependent and location dependent voltage induced phase shift along the modulating section) as light passing in the opposite direction at the same time. In other words, the forward electro-optic response is the same as the backward electro-optic response.

Such a symmetrical configuration regarding the electrical properties of the branches allows the same electro-optic response in the forward and in the backward directions of propagation of light in the optical circuit. The symmetrical configuration regarding the electrical properties may be obtained by geometric symmetry of the branches or only by a symmetry of electrical properties of the branches.

Thus, in an embodiment, the shape of the electrode line including the first and the second branch is symmetric with respect to the midpoint. The shape of the electrode line may be mirror-symmetric with respect to a plane passing through the midpoint and normal to the waveguide. Alternatively, the shape of the electrode line may have a rotational symmetry around an axis passing through the midpoint and normal to the plane in which the electrode line lies.

In an embodiment, the electro-optic modulator, includes a signal generator configured to apply a voltage to a terminal of the electrode line, thereby generating a microwave signal in the branches of the electrode line, with the frequency of the microwave signal lying at or near a center frequency. The center frequency corresponds in each branch, to a center wavelength of the signal, wherein in each branch, the center wavelength of the microwave signal or an integer multiple of the center wavelength equals twice the extension of the branch. This use of the signal is preferably implemented in the distance measurement device.

In an embodiment, a bottom face of the substrate, opposed to the surface at which the waveguide and electrode line are arranged (top surface), is roughened to a degree of at least $Ra=0.3$ μm, and preferably within the range $Ra=0.5-0.7$ μm, or the bottom surface is not parallel to the top surface (wedged shape). This reduces or eliminates mechanical resonances that may arise in the substrate due to the piezo-electrical effect.

In summary, the electro-optic modulator comprises one or more of the following features:

A birefringent electro-optic crystal.

The ordinary and extraordinary axes are orthogonal to the direction of propagation of light.

The direction of propagation of light is parallel to one of the ordinary axis

The crystal orientation is chosen to use the highest electro-optic coefficient and to maximize the differential electro-optic phase modulation between the two crossed polarization.

An optical waveguide is integrated at the surface of the crystal.

The waveguide can support both states of polarization.

Two coplanar lumped electrodes are patterned apart of the waveguide in order to induce an external electric field to interact with the electro-optic coefficients involved in the differential phase modulation.

The symmetrical configuration allows the same electro-optic response in the forward and in the backward directions of propagation of light in the optical circuit.

The two electrode lines are short circuited at their ends to allow a band pass behaviour at the desired frequency.

The length of each of the electrode lines can be equal to the wavelength of the microwave signal propagating in the line to optimize the response at this desired frequency.

The crystal can be piezo-electric. Acoustic wave resonances may be generated between the top surface from the electrodes to the bottom face of the substrate. Grinding to achieve a certain surface roughness, machining grooves into the bottom face, or wedging (inclining) of the bottom face can eliminate the resonances conditions.

When packaged, the modulator can generate microwave resonance in the case housing. Microwave absorber at the surface of the device and of the electrodes can avoid the generation of microwave resonances.

BRIEF DESCRIPTION OF THE DRAWINGS

The subject matter of the invention will be explained in more detail in the following text with reference to exemplary embodiments which are illustrated in the attached drawings, which schematically show.

DETAILED DESCRIPTION OF THE INVENTION

In principle, identical parts are provided with the same reference symbols in the Figures.

Convention: A phase modulator uses an electro-optic crystal. The index of modulation will define the so-called half wave voltage $V\pi$. The half-wave voltage is a characteristic of an electro-optic modulator and corresponds to the voltage that needs to be applied to the crystal in order to modify the optical phase of transmitted light by π-radians.

A guided wave configuration of an electro-optic modulator is as follows: a straight optical waveguide is shaped in a crystal surface, allowing the confinement of light in a small channel whose cross section is of some micrometers in width and height. Coplanar electrodes are arranged near the waveguides with a gap of some micrometers, application of a strong electric field to the waveguide. The half wave voltage can reduced to a few volts, much less than for bulk crystal modulators.

Guided wave modulators in, e.g. lithium niobate, can work at very high frequencies, thanks to this low voltage configuration. Special travelling wave electrodes, made of coplanar waveguides (CPW) microwave lines allows to get a phase matching condition between the optical wave propagating in the waveguide and the microwave propagating in the CPW lines, both waves travelling in the same direction and at the same velocity. Generally, in a high speed travelling wave integrated optic modulator, the microwave electrical signal is fed by one side of the modulator to the input strip of the CPW line, close to the optical input of the waveguide. The end of the microwave line is set near the optical waveguide output. However, such a configuration is not suited for the use in a distance measurement device in which the light passes through the modulator a second time, in the opposite direction: On returning, the light interacts with an electrical signal propagating in the opposite direction. Consequently, at high frequencies, the electro-optic responses in the forward and backward direction differ strongly.

Figure 2B:
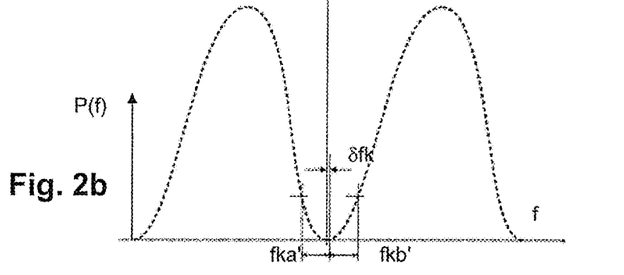

Using an integrated phase modulator in a distance meter arrangement as in FIG. 1, it can be shown that the shape of the average electrical power P(f) at the output of the photoreceiver 107, as a function of modulation frequency, is similar to the curve shown in FIG. 2a. The main property is that the zeroes of P(f) remain in place. Ideally, the curves are symmetrical, which is a precondition for the distance measurement, which needs to determine a zero point of the curve. In one method for determining the zero point, rather than determining the zero point itself, two points to the left and right of the zero point having the same power P(fka)=P(fkb) are determined. The frequency of the zero point, assuming symmetry of the curves, is then computed as (fka+fkb)/2. However, depending on the geometrical and physical properties of the microwave electrodes, the shape of the curve around the zero points may become asymmetrical. This is shown in FIG. 2b. This in turn distorts the distance measurement. With the criterion P(fka)=P(fkb), the asymmetry can cause the resulting (fka+fkb)/2 to be different from the correct fk, introducing an error in the determination of the absolute distance L.

Furthermore, it is possible to demonstrate that if the electrodes are fed just by the middle of the electrode lines, P(f) becomes equal to zero, and a perfect symmetry of the response of the modulator is recovered for both the forward and backward directions of propagation of light. Furthermore, the center of gravity of modulation remains at the same location, independent of the modulation frequency.

A possible design is thus that two parallel lines are fed by an input electrical strip set at the exact center of the electrodes, yielding a perfect symmetry to the device whose response is totally independent of the direction of propagation of the light.

Figure 3:
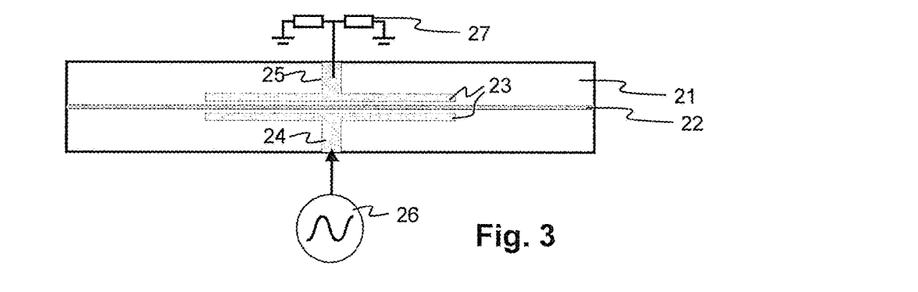
FIG. 3 an integrated phase modulator with such symmetrical electrodes.

FIG. 3 shows such an integrated phase modulator with such symmetrical electrodes: In a substrate 21, a waveguide 22 is embedded, and a coplanar electrode pair 23 is arranged to apply a field to the waveguide 22. One electrode of the electrode pair 23 is fed by an input strip 24 from a signal generator 26, the other electrode is connected by an output strip 25 to a termination resistor arrangement 27.

A drawback to this scheme is that now the modulator electrodes can be described as lumped electrodes whose frequency response does not depend on line characteristics such as impedance, loss, effective microwave index, but depends on its capacitance. Such electrodes give the electro-optic modulation response a low pass filter characteristic and consequently are not suitable to work at high frequencies (e.g. in the GHz range). This effect could be reduced to a limited degree by shortening the electrode length, but this in turn would increase the required half wave voltage Vπ.

Figures 4A, 4B:
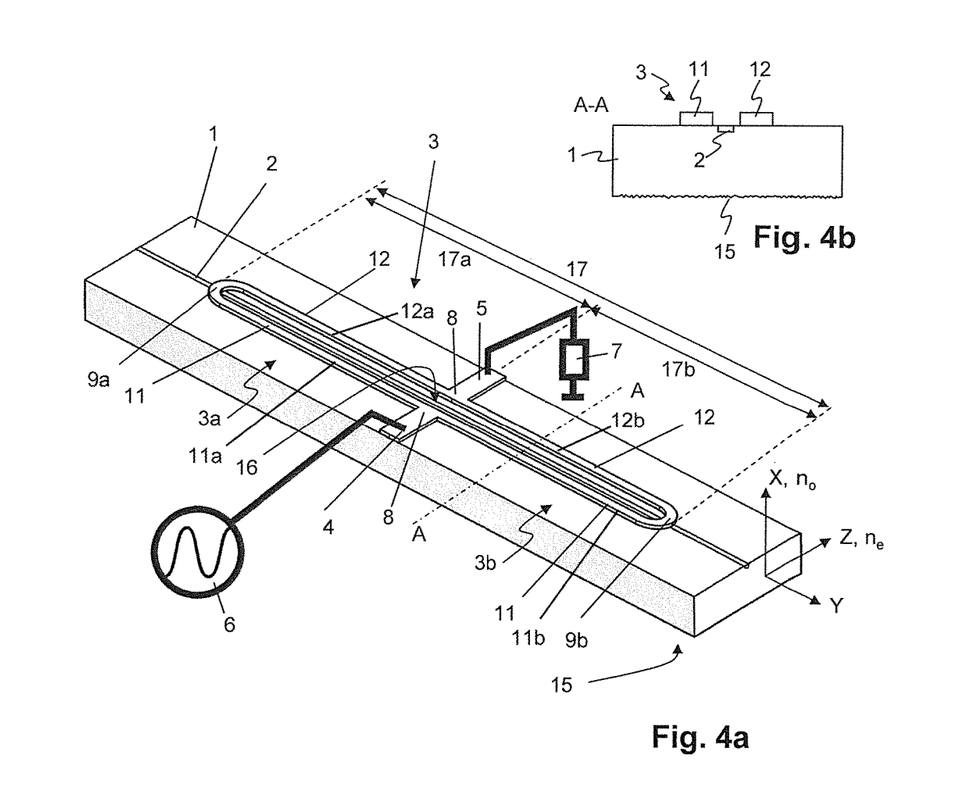
FIG. 4a, 4b an integrated phase modulator having a band pass response.

FIGS. 4a and 4b show a modulator that overcomes these disadvantages and exhibits a band pass response. The modulator includes a substrate 1 of a birefringent electro-optic crystal. Possible materials are, for instance, ferroelectric crystals such as lithium niobate (LiNbO3) or lithium tantalate (LiTaO3). The crystal orientation chosen is such that, the main axis Z of extraordinary refractive index $n_e$ is aligned at 90° with respect to the direction of propagation of light. With this condition the incoming light will always be submitted to both the extraordinary refractive index $n_e$ for one polarization state of light and to the ordinary refractive index $n_o$ for the 90° polarization state of light, in order to introduce between these waves an optical delay larger than the coherence length of the broadband source and to prevent any spurious interference coming, for instance, from parasitic optical return loss.

A preferred orientation is a substrate of LiNbO3 in X-cut configuration, with the Y axis parallel to the direction of propagation of light, the X axis orthogonal to the surface plane of the substrate, and the extraordinary optical axis Z parallel to the surface and orthogonal to the direction of propagation of light. This configuration is abbreviated as "X-Cut, Y-propagation, Z-transverse".

At the surface of the crystal, a straight waveguide 2 is diffused in the substrate 1. It can be obtained in the case of lithium niobate by titanium in diffusion, although different metals can be used for the waveguide preparation.

Thus, the substrate includes first the said optical waveguide 2 supporting both states of polarization and coplanar strips that are sections 11, 12 of an en electrode line 3 parallel to the waveguide 2. The X-cut crystal allows placement of the line sections 11, 12 on both side of the waveguide 2. The gap between the line sections 11, 12 acting as electrodes is slightly larger than the waveguide width in order to avoid any attenuation of the guided optical field by a metal layer. With this scheme, the metal electrode can be deposited directly at the substrate surface without any dielectric buffer layer, which would be required in case of a Z-cut, Y-propagation, X-transverse configuration (abbreviated as "Z-cut" configuration).

The electrode includes two electrode lines 3, a first branch 3a and a second branch 3b. These branches both start at an input strip 4 and end at an output strip 5 (both of microstrip type), but extend along the waveguide 2 in opposite directions. Each of the branches 3a; 3b includes a first line section 11a; 11b connected at on end to the input strip 4 and running along the waveguide 2. At the other end, the first line section 11a; 11b is connected, by a line end short circuit 9a; 9b, to a second line section 12a; 12b, which runs back along the waveguide 2 and is then connected to the output strip 5. The input strip 4 is electrically connected to and supplied by a signal generator 6, the output strip 5 is electrically connected to a termination element such as a resistor 7, whose impedance can be matched to the characteristic impedance of the electrodes. The input strip 4 and output strip 5 are located at a midpoint 16 along the length of the electrode and are preferably symmetrically shaped and attached, each by a T-coupler 8, to the beginning of the first line sections 11*a*; 11*b* and the ends of the second line sections 12*a*; 12*b*, respectively.

Note that the term "length of the electrode" or "electrode length" is used to denote the extension of the electrode as a whole along the waveguide 2, whereas each of the branches 3*a*, 3*b* has a length that is measured along the meandering branch. In the present symmetrical embodiment in which each branch runs back along itself exactly once, the length of the electrode is the same as the length of each of the branches 3*a*, 3*b*. The length of the first line section 11*a*, 11*b*, which equals the length of the second line section 12*a*, 12*b*, shall be called the "extension of the branch" (since it is the length along which the branch extends in one direction before turning back on itself).

An electrical signal on the electrode line 3 generates an electrical field in the vicinity of the line. A section of the waveguide 2 in which this field affects the light passing along the waveguide 2 shall be called modulation region 17. Its length is essentially the length of the electrode along the waveguide 2, in other words, the sum of the extension of the first and second branch. For each branch 3, the electrical fields of the two sections 11, 12 are superposed, with the resulting superposed or total field affecting the modulation region 17. The first branch 3*a* influences the light in a first subregion 17*a*, the second branch 3*b* influences the light in a second subregion 17*b* of the modulation region 17. In the embodiments presented in the present application, the electrode length essentially equals the length of the modulation region 17, and the extension of each branch 3*a*, 3*b* equals the length of the corresponding subregion 17*a*, 17*b*.

FIG. 4*b* shows a cross section along the XZ-plane. In addition to the elements already described, this figure schematically shows a bottom face 15 opposite the face carrying the electrode lines and having a roughened surface. The roughened surface eliminates or at least reduces acoustical resonances that may be generated when the electrical signal is applied to the electrode lines 3.

This design of the electrodes 3 allows a band pass modulation at high frequency. The input strip 4 carries the signal to a T-coupler 8 that splits the incoming electrical microwave signal into two balanced parts to the two output branches 3*a*, 3*b* of the electrode line 3. These two branches 3*a*, 3*b* propagate the incoming microwave in the forward direction for the first branch 3*a* and in the backward direction for the second branch 3*b*. Each branch 3*a*, 3*b* can be considered in a first approximation as a microstrip line in which the microwave propagates with a given effective microwave index and with a given characteristic impedance. At reaching the short circuit at the end of each outgoing first line section 11 the guided microwave propagates now along the second line section 12 in each branch 3*a*, 3*b* of electrode in opposite directions, going respectively in the backward direction for the first branch 3*a* and in the forward direction for the second branch 3*b*.

One can see that at low frequencies, the wavelength of the microwave being long compared to the electrode length, the voltage potential does not change during the propagation along the forward and the backward direction (respectively backward and forward for the second branch). The difference of electrical potential remains thus unchanged and nearly equal to zero. So no electro-optical modulation is applied to the light propagating in the optical waveguide.

When the frequency of the modulating signal increases, the length of each electrode branch cannot be neglected relative to the wavelength of the microwave signal. For at least one frequency, it holds that in each branch 3*a*, 3*b* the phase of the field propagating along the first line section 11 and the field (reflected by the short circuit) propagating along the second line section 12 are opposite in phase. In this situation, the difference of voltage between the line sections is maximized. This situation occurs first when the electrical wavelength $L_1$ is equal to two times the extension of the branch. In other words, $L_1$ is equal to two times the distance from the midpoint 16 to the short circuit at which the branch folds back onto itself. In the present symmetrical arrangement of the two branches 3*a*, 3*b* this also means that $L_1$ is equal to the length the electrode. The situation is repeated for integer fractions of $L_1$, that is for $L_1/2$, $L_1/3$, $L_1/4$, etc. For wavelengths near $L_1$ and its integer fractions the difference of voltage slowly decreases, following a sine function.

Figure 5:
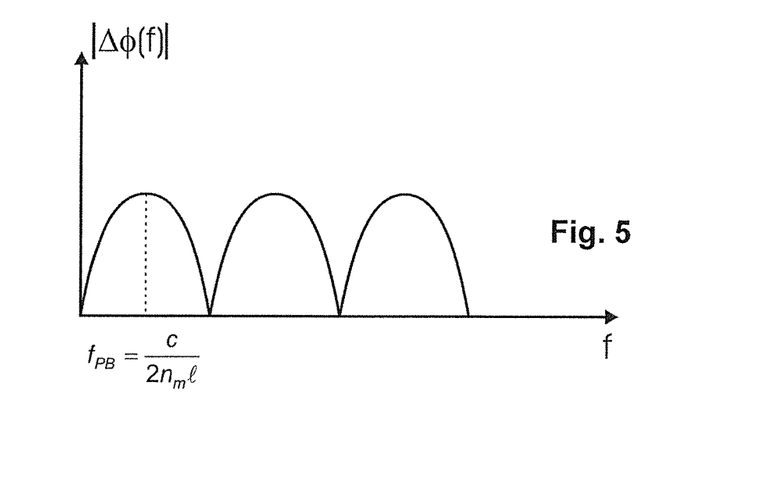
FIG. 5 the frequency response of the amplitude of the electro-optical phase modulation of the modulator of FIG. 4a and b.

FIG. 5 schematically shows the frequency response of the amplitude of the electro-optical phase modulation $\Delta\phi(f)$: The amplitude of the phase modulation applied to the light wave propagating in the modulator is proportional to:

$$\sin\left(\beta_m \frac{\ell}{2}\right)$$

where l is the electrode length, which here is equal to the length of the modulation region 17, and $\beta_m$ is a factor depending on other variables.

One can deduce the position of the 1st maximum.

$$f_{PB} = \frac{c}{2n_m \ell}$$

with c being the speed of light and $n_m$ the microwave (refractive) index of the electrode line electrode line 3, that is, the ratio of the electrical wave speed to the speed of light.

Finally, the waves propagating in each branch 3*a*, 3*b* of each electrode line 3 recombine on the output T-coupler to the output strip 5. A termination resistor 7 matched to the characteristic impedance of the line can absorb the signal in order to minimize the electrical return loss to the electrical source 6.

In an exemplary embodiment, the modulator includes the following features:
- Birefringent Lithium niobate substrate
- Size: Length 25 mm, Thickness 0.5 mm, width 2 mm
- Configuration: X-Cut, Y-propagation, Z-transverse (abbreviated as "X-Cut configuration")
- Wavelength 800 nm
- Titanium in diffused technology
- Optical waveguide single mode at 800 nm
- Coplanar Cr—Au thin film electrodes
- Ring configuration of the electrode
- electrode gap 12 μm
- The length of one branch of the ring is equal to the effective wavelength of the microwave in the line (example: 20 mm for a 2 GHz center frequency) and is equal to twice the extension of the branch.
- Single input microstrip and single output microstrip
- High roughness of the back face to prevent from piezoelectric acoustic resonances.

Microwave absorber arranged at or above the surface of the chip to prevent the formation of microwave resonances induced by the case housing.

Figures 6A, 6B:
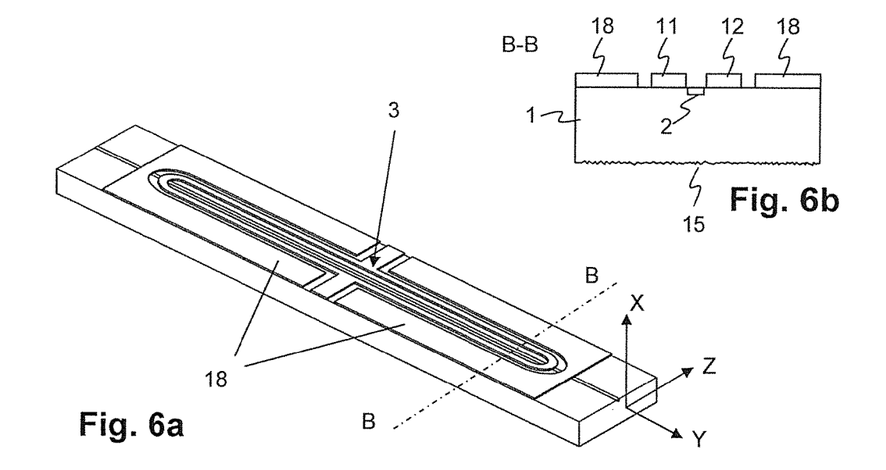
FIG. 6-11 further embodiments of band pass modulators.

FIGS. 6a and 6b show a perspective view and a sectional view of another embodiment, with essentially the same characteristics as that of FIGS. 4a and 4b, but with an electrically grounded ground plane 18 coplanar with the electrode and covering the substrate 1 essentially in places not covered by the electrode. This ground plane 18 allows modification of the propagation characteristics, in particular the speed of the microwave signal along the electrode lines 3.

Figures 7A, 7B:
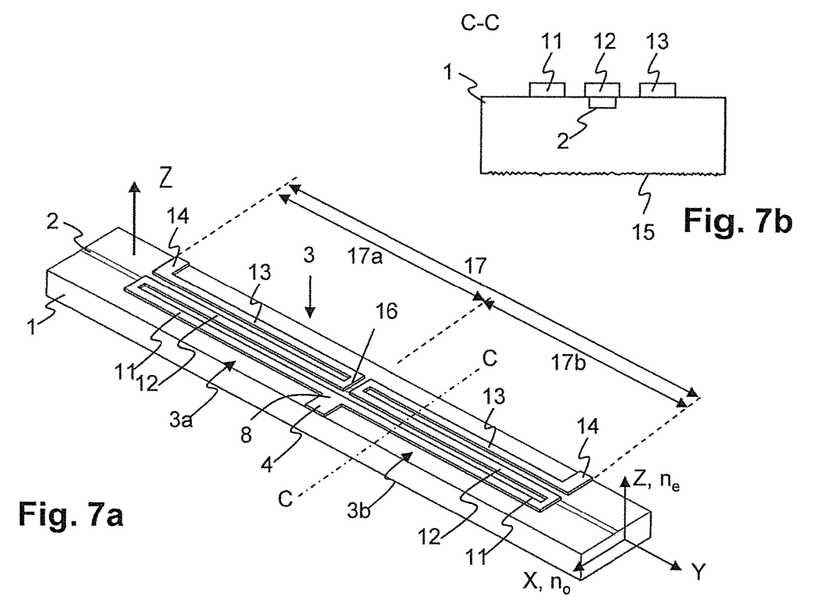

FIGS. 7a and 7b show a perspective view and a sectional view of another embodiment, with essentially the same characteristics as that of FIGS. 4a and 4b, except for the following:

Configuration: Z-Cut, Y-propagation, X-transverse (abbreviated as "Z-Cut configuration")

S-shape configuration of the electrode branches

As above, twice the extension of each branch equals the effective wavelength of the microwave applied, but since the branch folds back on itself twice, the length of the branch is equal to three times the extension of the branch Single input microstrip and dual ended line output microstrip In more detail, in this embodiment the planar electrode line 3 comprises two branches 3a, 3b, each branch comprising, beginning at the T-coupler 8 of the input strip 4, a first line section 11 running, in an initial direction, in parallel along the waveguide 2 and at a first side of the waveguide 2, a second line section 12 running, in a direction opposite to the initial direction, in parallel along and above the waveguide 2, a third line section 13 running, in the initial direction, in parallel along the waveguide 2 and at a second side of the waveguide 2, the second side being, relative to the waveguide 2, opposed to the first side, and an output strip 14 which is to be connected to an terminating resistance.

Figure 8:
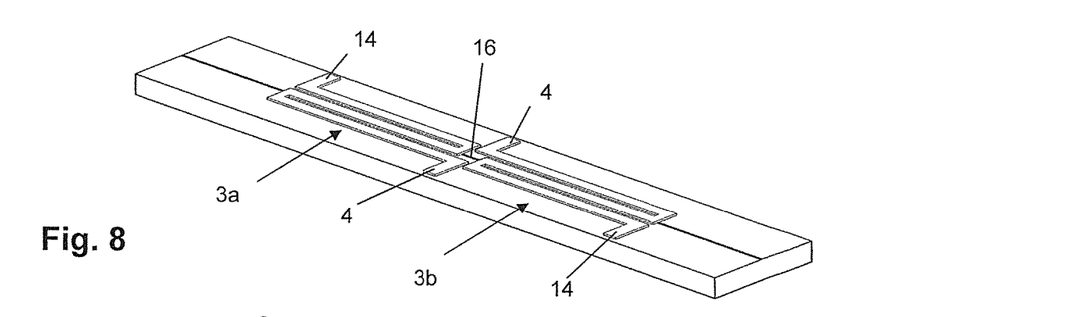
Figure 9:
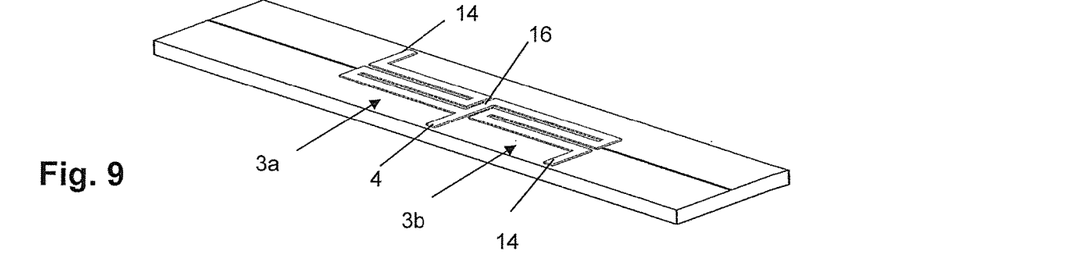

FIG. 8 and FIG. 9 show further embodiments of modulators in Z-Cut configuration with the branches 3a, 3b having a point symmetry or rotational symmetry with regard to the midpoint 16, instead of the mirror symmetry of the previous embodiments. In FIG. 8, the two branches are fed by a common input strip 4, in FIG. 9, each branch has a separate input strip 4, 4'. The roles of input strips and output strips can be reversed. The gap at the midpoint 16 between the first and second branch can be made larger than shown, distancing the branches from one another in the Y-direction.

In the symmetrical embodiments for a Z-Cut configuration, as in FIGS. 7a, 7b, 8 and 9, each branch 3a, 3b runs back along itself exactly twice, and the length of each of the branches 3a, 3b (that is, the sum of the length of the first 11, second 12 and third line section 13) is three times the extension of the respective branch. The wavelength of the microwave signal applied to the electrode lines 3 is preferably twice the extension of the branch. Alternatively, an integer multiple of the wavelength of the microwave signal is equal to twice the extension of the branch.

In further, asymmetrical embodiments, the first and second branches 3a, 3b do not have a symmetrical but rather a different geometry, for example, a different cross section. Consequently, they have a different microwave refractive index, since the propagation speed of the microwave depends on the geometry, among others. This, in turn, causes the wavelength of the microwave signal in the differently shaped branches to differ. Note that here, as for the preceding embodiments, the "wavelength of the microwave signal" denotes the effective wavelength, that is, the wavelength of the signal as it appears in the respective conducting line. Increasing the width of the microstrip constituting a branch causes the speed of the microwave travelling along the branch to decrease. In order for the microwave signals to arrive at the same time at the output taper—and to cause the same modulation in the waveguide 2—the extension of a branch divided by the speed of the signal in that branch should be the same for both branches.

Consequently, in these further embodiments the extension of the branches is adapted to the different wavelengths. A branch in which the microwave signal travels faster, for example, by narrowing the branch, is thus made longer in order to keep the time that the signal takes to travel along the length of the branch the same. The two branches are not geometrically symmetrical, but the electro-optic modulation effect on light passing through the waveguide 2 is symmetrical, and is the same regardless of the direction in which the light passes through the waveguide 2. Examples for such geometrically asymmetric electrode branches are given in FIGS. 10 and 11.

Figure 10:
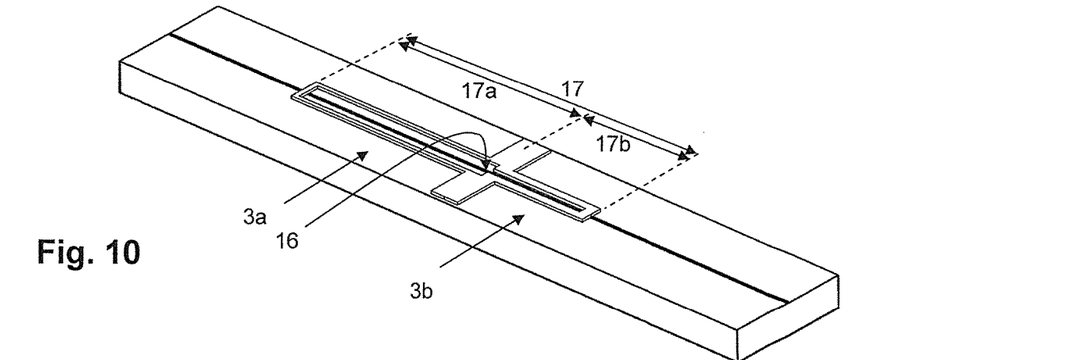

FIG. 10 shows a X-Cut configuration in which the first branch 3a includes a thinner conducting strip than the second branch 3b. Correspondingly, the extension of the first branch 3a, and the first subregion 17a, is longer than that of the second branch 3b. The following relations hold (as also for all preceding embodiments)

In both branches, the wavelength of the microwave signal (or an integer multiple thereof) is twice the extension of the branch.

The electrode length is the sum of the different extensions of the two branches 3a, 3b.

Figure 11:
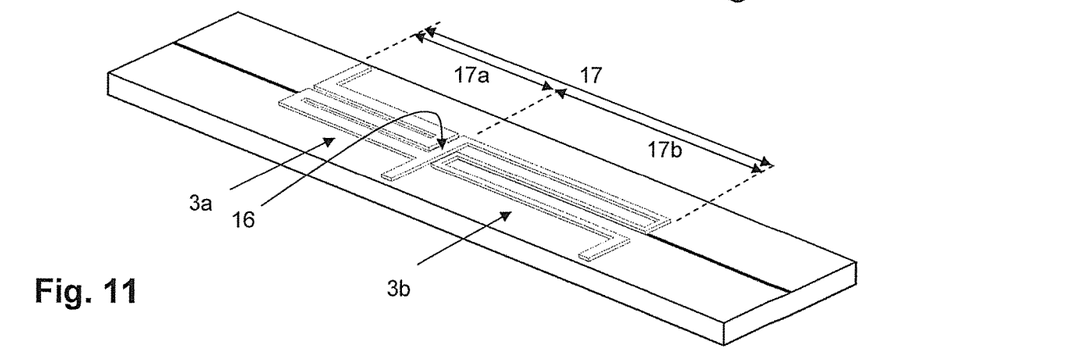

These relations also hold for FIG. 11, which shows a Z-Cut configuration in which the first branch 3a includes a thicker conducting strip than the second branch 3b.

These relations also hold for configurations (not illustrated) in which the microwave signal speed is modified by modifying the dielectric properties of the materials surrounding the branches, or by further elements affecting the microwave propagation along the electrode line 3, such as the ground plane 18. Such a modification of the signal speed may be effected by symmetrically arranged elements (i.e. corresponding symmetric elements on both branches), or by having different elements on the two branches but the same effect on signal propagation.

A distance measuring device utilising one of the integrated modulators presented in the foregoing preferably has a structure and is operated like the distance measuring device of FIG. 1, but with the bulk electro-optic crystal 103 replaced by one of the integrated modulators. The signal source 108 is configured to generate a signal, preferably a microwave signal in the GHz range, whose wavelength (or an integer multiple thereof) in each branch 3a, 3b of the modulator is twice the extension of the respective branch 3a, 3b.

In an embodiment, the center frequency of the microwave signal is, for example, in the range between 2 and 3 GHz. The modulation bandwidth is, for example, in the range of several hundreds of MHz. This is well suited for distance measurement applications.

While the invention has been described in present preferred embodiments of the invention, it is distinctly understood that the invention is not limited thereto, but may be otherwise variously embodied and practised within the scope of the claims. For example, whereas the embodiments shown so far use a single source connected to the input strip and a terminating resistance connected to the output, alternative embodiments can have a generalized impedance or a second source connected to the output.

The invention claimed is:

1. An electro-optic modulator, comprising:
a straight waveguide of a nonlinear optical material; and,
an electrode line arranged to generate an electrical field in a modulating region of the waveguide when a voltage is applied to the electrode line so as to modulate a phase of light passing through the waveguide,
wherein the electrode line comprises a first branch and a second branch, wherein each branch:
extends from a beginning to an end of a first line section parallel to the waveguide in a first direction for a first distance,
extends from the beginning to an end of a second line section parallel to the waveguide for a second distance in a second direction, said second direction being opposite to said first direction and said second distance being equal to said first distance,
wherein the first and second line sections of the branch affect a modulation subregion of the waveguide; and wherein
the electro-optic modulator comprises a signal generator configured to apply a voltage to a terminal of the electrode line, and thereby generates a microwave signal in the branches of the electrode line, wherein a frequency of the microwave signal is at or near a center frequency, the center frequency corresponding, in each branch, to a center wavelength of the microwave signal, wherein in each branch the center wavelength of the microwave signal or an integer multiple of the center wavelength, is equal to twice the first distance,
wherein the waveguide and the electrode line are configured to provide a forward electro-optic response in the modulating region and a backward electro-optic response in the modulating region, said forward and backward electro-optic responses being equal to one another, and
the waveguide and the electrode line are configured such that the forward and backward electro-optic responses have a band-pass or a low-pass characteristic.

2. The electro-optic modulator of claim 1, wherein the waveguide and the electrode line are constructed such that a center of gravity of the modulation, which is a point along the waveguide at which the total modulation of light in one section is equal to the total modulation of light in a second section, is independent of modulation frequency.

3. The electro-optic modulator of claim 1, wherein:
the modulating region comprises a first subregion and a second subregion and,
the electrode line is adapted to provide a first effective modulation on light passing in one direction through the first subregion and a second effective modulation on light passing in the opposite direction through the second subregion, wherein the first effective modulation is equal to the second effective modulation.

4. The electro-optic modulator of claim 1, wherein
a microwave signal propagation time from the beginning of the first line section to the end of the second line section of the first branch is equal to a microwave signal propagation time from the beginning of the first line section to the end of the second line section of the second branch.

5. The electro-optic modulator of claim 4, wherein
each branch, from the end of the second line section:
runs in a third line section parallel to the waveguide for a third distance in the first direction,
and wherein the microwave signal propagation time from the beginning of the first line section to the end of the third line section of the first branch is equal to the microwave signal propagation time from the beginning of the first line section to the end of the third line section of the second first branch.

6. The electro-optic modulator of claim 1, said electrode line comprises:
a first branch, a second branch, and a midpoint between the first and second branches, wherein
the electrode line is adapted, when connected to an electric microwave signal source, to generate an electrical field distribution in the waveguide that is symmetrical with respect to the midpoint.

7. The electro-optic modulator of claim 4, wherein the electrode line comprises a midpoint between the first branch and the second branch, and wherein the electrode line is adapted, when connected to an electric microwave signal source, to generate an electrical field distribution in the waveguide that is symmetrical with respect to the midpoint.

8. The electro-optic modulator of claim 6, wherein the shape of the electrode line comprising the first and the second branch is mirror-symmetric with respect to a plane that passes through the midpoint and normal to the waveguide.

9. The electro-optic modulator of claim 6, wherein the shape of the electrode line comprising the first and the second branch has a rotational symmetry around an axis that passes through the midpoint and normal to the plane in which the electrode line lies.

10. The electro-optic modulator of claim 1, wherein a bottom face of a substrate, opposed to a substrate surface at which the waveguide and electrode line are arranged, is roughened to a degree of at least Ra=0.3 micrometers or inclined relative to the substrate surface at which the waveguide and electrode line are arranged.

11. An electro-optic distance measuring device comprising the electro-optic modulator of claim 1.

12. The distance measuring device of claim 11, further comprising a light source emitting light, wherein the electro-optic modulator is arranged in the distance measuring device such that light emitted by the light source passes through the modulating region of the waveguide in a first direction before being emitted from the distance measuring device, and such emitted light after being reflected from a target outside the distance measuring device passes through the modulating region of the waveguide in a second direction, which is opposite to the first direction.

13. An electro-optic modulator, comprising:
a straight waveguide of a nonlinear optical material; and
an electrode line arranged to generate an electrical field in a modulating region of the waveguide when a voltage is applied to the electrode line so as to modulate a phase of light passing through the waveguide,
wherein: the electrode line comprises a first branch and a second branch, each branch:
extending from a beginning to an end of a first line section parallel to the waveguide in a first direction for a first distance, and
extending from the beginning to an end of a second line section parallel to the waveguide for a second distance in a second direction, said second direction being opposite to said first direction and said second distance being equal to said first distance, wherein the first and second line sections of the branch affect a modulation subregion of the waveguide; and wherein a microwave signal propagation time from the beginning of the first line section to the end of the second line section of the first branch is equal to a microwave signal propagation time from the beginning of the first line section to the end of the second line section of the second branch, the electrode line comprises a midpoint between the first branch and the second branch, and the electrode line is adapted, when connected to an electric microwave signal source, to generate an electrical field distribution in the waveguide that is symmetrical with respect to the midpoint, wherein the waveguide and the electrode line are configured to provide a forward electro-optic response in the modulating region and a backward electro-optic response in the modulating region, said forward and backward electro-optic responses being equal to one another, and the waveguide and the electrode line are configured such that the forward and backward electro-optic responses have a band-pass or a low-pass characteristic.

14. An electro-optic modulator, comprising:

a straight waveguide of a nonlinear optical material; and an electrode line arranged to generate an electrical field in a modulating region of the waveguide when a voltage is applied to the electrode line so as to modulate a phase of light passing through the waveguide, wherein: the electrode line comprises a first branch and a second branch, each branch:

extends from a beginning to an end of a first line section parallel to the waveguide in a first direction for a first distance, and extends from the beginning to an end of a second line section parallel to the waveguide for a second distance in a second direction, said second direction being opposite to said first direction and said second distance being equal to said first distance, wherein each branch, from the end of the second line section:

runs in a third line section parallel to the waveguide for a third distance in the first direction, and the microwave signal propagation time from the beginning of the first line section to the end of the third line section of the first branch is equal to the microwave signal propagation time from the beginning of the first line section to the end of the third line section of the second branch, wherein the waveguide and the electrode line are configured to provide a forward electro-optic response in the modulating region and a backward electro-optic response in the modulating region, said forward and backward electro-optic responses being equal to one another, and the waveguide and the electrode line are configured such that the forward and backward electro-optic responses have a band-pass or a low-pass characteristic.

* * * * *